United States Patent
Schafernak et al.

(10) Patent No.: US 6,479,128 B1
(45) Date of Patent: Nov. 12, 2002

(54) FINE TEXTURED SINGLE PIECE ONE PANEL MOLDED PROFILE

(75) Inventors: Dale E. Schafernak, Palatine; Steven K. Lynch, St. Charles; Connie Chen, West Chicago; Brian Bonomo, Oak Park, all of IL (US)

(73) Assignee: Masonite Corporation, Chicago, IL (US)

(*) Notice: Subject to any disclaimer, the term of this patent is extended or adjusted under 35 U.S.C. 154(b) by 99 days.

(21) Appl. No.: 09/715,569

(22) Filed: Nov. 17, 2000

Related U.S. Application Data
(60) Provisional application No. 60/167,353, filed on Nov. 24, 1999.

(51) Int. Cl.⁷ ............................ B32B 5/12; B32B 31/00; B29C 59/00; B27H 1/00
(52) U.S. Cl. ........................ 428/106; 428/156; 156/279; 264/119; 144/358; 52/784.1
(58) Field of Search .................. 428/106, 107, 428/113, 156, 537.1, 541; 264/119, 293; 162/103, 109, 113; 156/279, 62.2, 62.4; 144/358; 52/784.1

(56) References Cited

U.S. PATENT DOCUMENTS

| | | | |
|---|---|---|---|
| 2,343,740 A | 3/1944 | Birmingham | 154/40 |
| 2,831,793 A | 4/1958 | Elmendorf | 154/45.9 |
| 3,098,781 A | 7/1963 | Greten | 156/373 |
| 3,308,013 A | 3/1967 | Bryant | 162/103 |
| 3,478,861 A | * 11/1969 | Elmendorf | 198/383 |
| 4,007,767 A | 2/1977 | Colledge | 144/328 |
| 4,104,429 A | 8/1978 | Colledge | 428/151 |
| 4,221,758 A | 9/1980 | Burkey et al. | 264/225 |
| 4,246,310 A | 1/1981 | Hunt et al. | 428/106 |
| 4,361,612 A | 11/1982 | Shaner et al. | 428/106 |
| 4,364,984 A | 12/1982 | Wentworth | 428/106 |
| 4,610,913 A | 9/1986 | Barnes | 428/215 |
| 4,913,639 A | 4/1990 | Wheeler | 425/193 |
| 4,610,913 A | 10/1990 | Barnes | 428/215 |
| 5,543,234 A | 8/1996 | Lynch et al. | 428/537.1 |

FOREIGN PATENT DOCUMENTS

EP 0 688 639 A3 12/1995

* cited by examiner

Primary Examiner—Donald J. Loney
(74) Attorney, Agent, or Firm—Liniak, Berenato, Longacre & White, LLC

(57) ABSTRACT

An embossed, decorative, man-made embossed article having an embossed surface portion containing at least about 80% by weight cellulosic fibers and sufficient binder to adhere the cellulosic fibers together into a structurally sound article having a specific gravity in the range of 0.96 to 1.08, a surface of said article having a pattern of embossed ticks stained to visually distinguish the embossed ticks from surrounding surface portions of said article, said embossed ticks formed in elongated bundles to replicate a wood grain pattern, said embossed ticks and said bundles of ticks satisfying the following criteria:

(a) at least 90% of said embossed ticks, in bundles of three or more adjacent ticks, are spaced at least 0.016 inch;
(b) at least 90% of said embossed ticks are embossed a depth in the range of 0.003 inch to 0.007 inch; and
(c) at least 90% of the embossed tick bundles are separated by tick-free spans on the surface of the article, at the widest measurement of tick-free area between tick bundles, in the range of 0.050 to 0.280 inch.

23 Claims, 2 Drawing Sheets

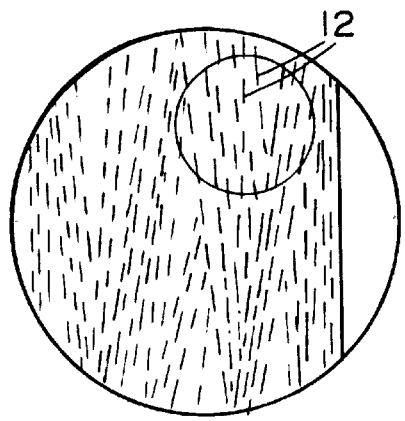
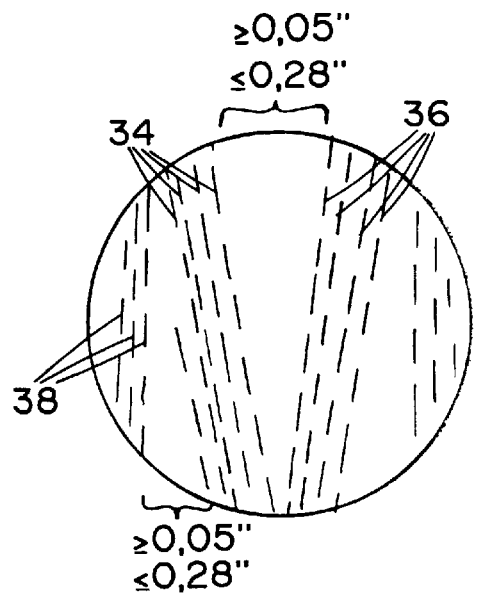
FIG. 5
FIG. 6
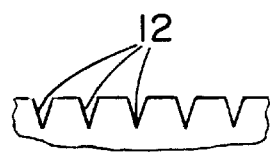
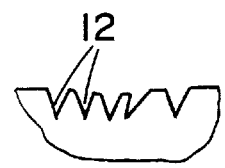
FIG. 3
FIG. 4
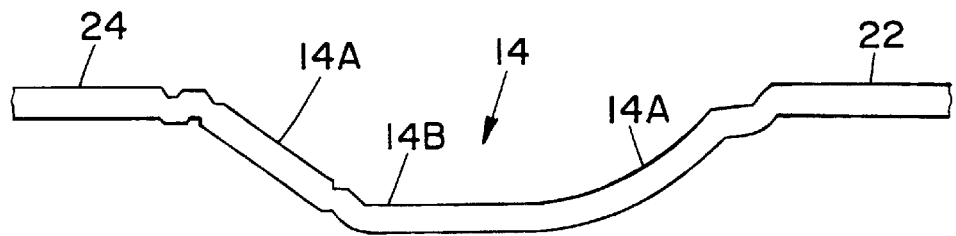
FIG. 2

FINE TEXTURED SINGLE PIECE ONE PANEL MOLDED PROFILE

CROSS-REFERENCE TO RELATED APPLICATION

This application is based on U.S. Provisional Patent Application Ser. No. 60/167,353 filed Nov. 24, 1999.

FIELD OF THE INVENTION

The present invention relates to a molded wood composite article particularly useful as a door skin or door-facing surface, and to a method of making the molded wood composite article, preferably having an inclined profile embossed or molded into a depression-interior portion of the article. More particularly, the molded wood composite article of the present invention is made from a combination of cellulosic fibers, and a natural or synthetic binder, such as a phenol formaldehyde or urea formaldehyde resin, including at least about 80% cellulosic material, and molded from a mat having at least an upper surface formed from refined, fibrillated cellulosic fibers, e.g., a fiberboard mat, such as that hot-pressed to produce hardboard. The upper surface of the molded article, including any inclined depression-interior surfaces, includes a finely textured hardwood grain pattern, such as oak, containing closely spaced embossed ticks, simulating furniture grade natural wood. The major surfaces of the articles are molded from a planar layer or mat of cellulosic material, e.g., a fiberboard mat, made either by the wet process or the dry process, preferably the dry process. The embossed grain pattern covers an entire outer major surface of the composite article, including, when present, the depression-interior inclined molded profile, and does not blister, has relatively constant paint holdout, and provides excellent embossing fidelity, while providing a closely spaced, finely textured wood grain pattern, with planar outer surfaces disposed between embossed ticks that form the grain pattern.

BACKGROUND OF THE INVENTION

Man-made boards, such as fiberboard, e.g., hardboard, commonly are embossed on their intended visible major outer surface in the manufacture of interior paneling, exterior siding, and particularly in the manufacture of door skins that are laminated to a support structure or frame, on both major surfaces, for replicating single-panel or multi-panel doors having surfaces that are man made, rather than the very expensive natural wood doors. Commonly, such articles are molded from a planar, loose cellulosic mat to include one or more interior or "closed" depressions, within an interior of the article, such as one or more square or rectangular depressions that do not extend to an outer edge of the article.

The cellulosic fibers used to form the loose mat, e.g., a 1½ or 2 inch thick layer of cellulosic fibers having a specific gravity of, for example, 0.6, initially may be bone dry after the fibers have been dried and felted, but the cellulosic fibers in such mats absorb moisture from the atmosphere and generally include about 2% to about 10% moisture when molded via hot pressing, depending upon the humidity in the region where such mats are stored and/or manufactured.

Natural wood grain patterns have been replicated in fiberboard surfaces by transferring a photographic image of the grain pattern into an embossing plate, by an etching process, to form raised portions or elongated spikes in the surface of the embossing plate and then pressing a loose fiberboard mat with the embossing plate to provide bundles of natural wood ticks that form the grain pattern on the resulting fiberboard surface, as well known in the art. A wood grain pattern is a cluster or bundle of spaced "ticks" that extend in a pattern, similar to the pattern shown in FIG. 1. The wood grain replication process is successful so long as the grain pattern that is replicated is a relatively loose grain pattern, where adjacent "ticks" (relatively short, relatively thin embossed depressions that form a bundle or cluster, and the bundle or cluster of ticks is arranged in a pattern of lines to form the wood grain pattern) are sufficiently spaced so that adjacent tick replicating spikes on the embossing plate, which emboss adjacent ticks in a bundle to form the replicated grain pattern into the fiberboard surface (as shown in FIG. 3), do not also depress the planar surface of the fiberboard disposed between adjacent ticks of a bundle (see FIG. 4).

Attempts to replicate tight grain patterns, present in slower growing hardwood trees having bundles of ticks with very closely spaced adjacent ticks, has not been successful since such close spacing of protrusions or spikes from the surface of an embossing plate will depress intended planar areas disposed between closely spaced, adjacent ticks, together with the tick area, as shown in FIG. 4. While it may be possible to replicate a tight grain pattern in the surface by embossing closely spaced ticks into a fiberboard mat formed from highly refined cellulosic material, the degree of refining would be cost prohibitive on a commercial scale.

Additional problems occur in attempting to form inclined molded portions on an interior surface of closed depressions in a molded wood composite article, particularly when it is commercially necessary to paint such inclined surfaces to provide an aesthetically pleasing tight wood grain pattern in the outer surface. One type of product, in particular, that must include excellent embossing detail and superior aesthetic qualities to be commercially acceptable, is a door skin that simulates a single-panel or multi-panel natural wood door on both major faces of a support substrate or frame member. Door skins, or door faces, require detailed, inclined interior molded walls having a plurality of relatively close contours that include varied curved and/or planar surfaces.

It has been found that these interior, inclined molded surfaces of interior inclined molded depression walls are very difficult to provide with a tight wood grain pattern of ticks and to paint uniformly due to density differences, because of various adjacent curved and/or planar contours and due to the confined locations of the inclined surfaces within the relatively small, molded depressions. These angled or inclined surfaces on wall portions molded into depressions formed in the interior of the product are extremely difficult to provide with embossed surfaces representing a tight wood grain pattern, since such embossed texture on depression-interior inclined walls have a tendency to cause the article to stick to the mold cavity at the embossed inclined wall, causing fiber to pull away from the surface of the molded article when it is removed from the mold cavity.

The molded wood composite articles of the present invention solve some or all of the above-mentioned deficiencies in prior art molded wood composite articles to provide a molded wood composite article that includes a tight grained hardwood pattern having excellent embossing fidelity that can be painted with uniform paint hold-out; can include, in the preferred embodiment, molded, inclined surfaces that are accessible for buffability, and wherein the planar upper surfaces, as well as the molded, inclined depression-interior surfaces, are capable of being embossed with excellent texture and tight grain detail to provide an extremely aesthetic, detailed texture or wood grain design.

DEFINITIONS

"Tick spacing" is measured from centerline to centerline of adjacent ticks through a straight line that most closely approximates a right angle to each centerline.

"Tick bundle" is a grouping of adjacent ticks that forms a wood grain appearance separated by a tick-free span from an adjacent tick bundle.

SUMMARY OF THE INVENTION

In brief, the present invention is directed to a molded wood composite article man-made from wood fibers on at least an upper, molded surface of the article, and a method of manufacturing the article to include a tight, finely textured grain pattern and textured aesthetics on a upper surface, as well as on any depression-interior, inclined surfaces, of the molded articles, while preventing embrittlement, softness and blistering of the article along the depression-interior inclined surfaces.

Accordingly, one aspect of the present invention is to provide molded, wood composite articles and a method of manufacturing the articles, wherein the articles are molded from a loose mat of cellulosic fiber and binder, such that the articles have an embossed, tight wood grain pattern including adjacent, closely spaced embossed ticks with planar surfaces between adjacent ticks.

Another aspect of the present invention is to provide molded, wood composite articles, and a method of manufacturing the articles, that include interior molded depressions having inclined, decorative surfaces that have an aesthetically superior tight wood grain pattern along the entire inclined surfaces, which are not brittle or blistered as a result of the molding process, and such that the articles can have an embossed, tight wood grain pattern on the entire outer surfaces of the article, including adjacent, closely spaced embossed ticks with planar surfaces disposed between adjacent ticks.

Another aspect of the present invention is to provide a molded, wood composite article, and method of manufacturing the article, containing at least about 80% cellulosic material, that is molded from an incompletely consolidated planar mat or preform using heat and pressure to include a decorative wood grain pattern of ticks, wherein adjacent ticks that form part of a tick bundle having three or more adjacent ticks are spaced no closer than 0.016 inch, and adjacent bundles of ticks are spaced by tick-free regions that are at least 0.050 inch and up to 0.280 inch at their widest tick-free span to provide excellent embossing fidelity in a molded, tight wood grain pattern.

The above and other aspects and advantages of the articles and methods of the present invention will become more apparent from the following detailed description of the preferred embodiments, taken in conjunction with the drawings.

BRIEF DESCRIPTION OF THE DRAWINGS

FIG. 2 is a side (profile), partially broken-away enlarged view of a preferred embodiment of a molded depression, taken along the line 2—2 of FIG. 1, that includes an interior inclined wall having planar and curved contours in its surface, forming a portion of the article of FIG. 1;

FIG. 3 is a partially broken-away, enlarged side view of a bundle of five adjacent ticks, said ticks embossed in accordance with the principles of the present invention;

FIG. 4 is a partially broken-away, enlarged side view of a bundle of five adjacent ticks, similar to that shown in FIG. 3, wherein the ticks are too closely spaced;

FIG. 5 is an enlarged top view of a circled, lower right hand corner portion of FIG. 1, showing various tick bundles forming the tight wood grain pattern embossed in accordance with the present invention; and FIG. 6 is an enlarged top view of a circled portion of FIG. 5 showing, in more detail, various tick bundles forming the tight wood grain pattern embossed in accordance with the present invention.

DETAILED DESCRIPTION OF THE PREFERRED EMBODIMENTS

Figure 1:
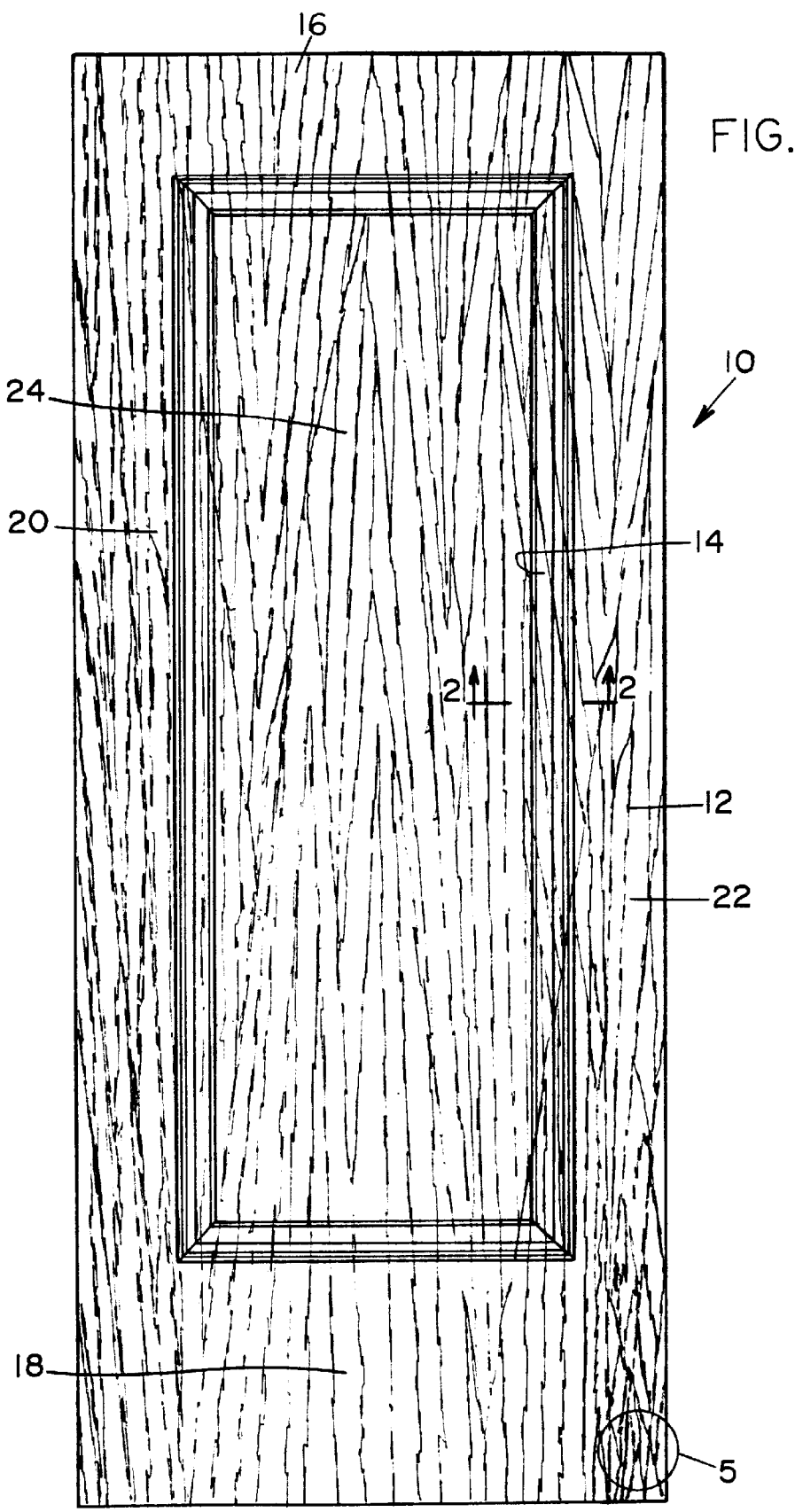
FIG. 1 is a top view of a door skin, shown in horizontal disposition, manufactured in accordance with the principles of the present invention.

In the preferred embodiment shown in the drawings, the molded wood articles of the present invention are molded in the form of a single-panel door, or, more preferably, as a thin door skin to be laminated or otherwise adhered to a core, frame or support substrate (not shown), on both major surfaces, to simulate a solid, natural wood door, e.g., as an outer surface of an interior or exterior passage door, as shown in FIG. 1, or a cabinet door. It should be understood, however, that the principles of the present invention apply to much more than the manufacture of doors or door skins and apply to any molded man-made composite wood article that omit the molded depression, or includes multiple molded depressions adjacent to a thicker planar, e.g., horizontal, surface portion of the molded article. Examples of other composite, molded wood articles that are capable of being manufactured in accordance with the principles of the present invention include decorative hardboard; interior and exterior passage door/garage door; decorative interior wall paneling; cabinetry, furniture components; and the like.

At least a surface portion of the articles of the present invention should be formed from cellulosic material, such as fibrillated cellulosic fibers, and a binder capable of adhering the cellulosic material together into a structurally stable, consolidated article. The cellulosic fibers are in the form of refined, fibrillated fibers and can be molded and adhered together with natural or synthetic binders to provide aesthetically pleasing contours and tight wood grain texture in all exterior, visible surfaces, including the depression-interior inclined wall surfaces. The articles of the present invention can be molded as a thin, e.g., 0.1 to 0.2 inch thick door skin, or the articles can be molded together with an underlying core material, such as an oriented strand board, particle board, plywood, wafer board, or a thermoplastic or thermosetting plastic core material by molding the face or skin cellulosic material together with the underlying core material. The following U.S. patents are hereby incorporated by reference as examples of various different cores, having cellulosic fibers or particles as a surface layer, that are suitable for molding in accordance with the present invention: Lynch, et al. U.S. Pat. No. 5,543,234; Shaner, et al. U.S. Pat. No. 4,361,612; Wentworth U.S. Pat. No. 4,364,984; Greten U.S. Pat. No. 3,098,781; Birmingham U.S. Pat. No. 2,343,740; Bryant U.S. Pat. No. 3,308,013; Elmendorf U.S. Pat. No. 2,831,793; Hunt, et al. U.S. Pat. No. 4,246,310; and Barnes U.S. Pat. No. 4,610,913. Alternatively, a thin cellulosic molded surface layer can be molded separately, in accordance with the present invention, and later laminated to a support structure.

Turning now to the drawings, and initially to FIG. 1, there is illustrated a top view of a door skin, generally designated by reference numeral 10, shown horizontal, as molded. The door skin 10 is molded with an embossing plate to impart aesthetic surface contours in the visible outer surfaces that correspond to contours essentially identical to contours of a mold cavity (not shown). The door skin 10 then can be secured, e.g., adhesively, to a suitable core or frame structure (not shown). The lower half of the mold cavity, if shown, would be essentially the same in general contour to an upper surface of the door skin 10, except that the lower mold half would be slightly larger horizontally, in the depression dimensions, to allow for the thickness of the molded cellulosic material forming the door skin. The upper mold half carries an embossing plate (not shown) dimensioned complementary to the upper surface of the door skin, and includes raised mold portions that form wood grain ticks 12 that form the tight wood grain pattern, and form a rectangular depression 14 shown in the upper surface of door skin 10.

The door skin 10 is molded with the mold cavity or die halves disposed in a generally horizontal disposition so that the upper major surface will be described as horizontal—corresponding to its disposition during molding—and it will be recognized that the position of the molded article, in use, may very well be vertical, instead of horizontal, as in the case of door skin 10, where the molded major surface normally would be disposed in a vertical orientation. The exemplary door skin 10, shown in FIG. 1, in the preferred embodiment, is molded to simulate a single-panel door surface, and each depression is completely surrounded by planar upper and lower stiles 16 and 18 and two-side horizontal door rail portions 20 and 22, respectively, lying in a common plane. As best shown in FIG. 2, the rectangular depression 14 surrounds a generally planar door skin panel portion 24 lying in the same plane as the stiles and rails 16, 18, 20 and 22.

In the preferred single-panel door skin 10 shown in FIG. 1, the depression 14 is rectangular in shape and the rectangular depression is completely surrounded, on its interior, by the door skin panel 24 that lies in the same horizontal plane as the horizontal door skin stile and rail portions 16, 18, 20 and 22, which surround the depression 14 on its exterior. The depression 14 includes inclined walls 14A having contoured upper surfaces that are integral with an upper surface of a planar panel 24, the inclined wall 14A extending downwardly from the planar panel 24 toward a bottom 14B of the depression, the depression 14, being surrounded on all sides by co-planar surfaces 16, 18, 20, 22 and 24.

The articles of the present invention are molded from a loose mat of cellulosic fibers and a binder, such as a urea formaldehyde or phenol formaldehyde binder commonly used in the manufacture of fiberboard. The mat should include at least about 80% fibrillated, refined cellulosic fibers. The fibers are mechanically refined from wood chips using steam pressures in the range of about 80 to 120 psi, preferably about 100 to 110 psi, more preferably about 105 psi. Steam pressures higher than about 120 psi in refining the cellulosic fibers produce highly refined fibers that are useful in accordance with the present invention, but the cost of refining would be commercially prohibitive.

Such refining of cellulosic fibers will provide fibrillated cellulosic fibers that are preferably dry laid into a loose cellulosic fiber mat having a basis weight in the range of 0.58 to 0.62 pounds per cubic inch. Upon molding in a heated press at a temperature in the range of about 385° F. to 450° F., and at a maximum pressure in the range of about 550 to about 850 psi, the resulting embossed articles will have a specific gravity in the range of about 0.96 to about 1.08, preferably about 0.98 to about 1.06, more preferably about 1.00 to about 1.04. Articles of the present invention that are embossed at specific gravities lower than about 0.96 will have insufficient embossing fidelity of ticks, with insufficient surface toughness and insufficient tick paint holdout or stainability. At a specific gravity higher than about 1.08, the cellulosic fibers will carmellize and become embrittled and/or blistered.

In accordance with an important feature of the present invention, a tight, high frequency natural wood grain tick graining pattern (best shown in FIGS. 5 and 6) is embossed into the surface of the loose mat of fibrillated cellulosic fibers while achieving unexpectedly superior embossing fidelity and unexpectedly superior stainability in the embossed surfaces, thereby achieving the aesthetics of slow growing, higher value natural hardwood. Previous attempts to emboss such high frequency tick graining into a fiberboard surface have resulted in a visibly blurred depression, where a plurality of adjacent ticks are simultaneously depressed into a single depression, as shown in FIG. 4, resulting in stain retention over substantially the entire depression—an area much larger than the tick area, where stain is retained by regions between individual ticks. In accordance with the process of the present invention, excellent embossing fidelity is achieved so that a darker appearance, via staining, is achieved only where intended, in the embossed tick areas 12, and not in the planar regions 22 between the embossed ticks.

The unexpected embossing fidelity, tick-selective increased stain reception (stainability) and unexpectedly superior aesthetics are achieved, in accordance with the present invention, without the stain blurriness or blotchiness mentioned above, while reproducing a tightly packed pattern of embossed ticks, by embossing the ticks in carefully arranged groupings or elongated bundles that form a wood grain pattern, as described in more detail hereinafter.

At least 90%, preferably at least 95%, of the embossed ticks should fall within the following tick and tick grouping parameters: the ticks 12 should be embossed to a depth in the range of 0.003 inch to 0.007 inch in order to retain sufficient stain to replicate natural wood grain; adjacent ticks in tick bundles containing three or more ticks, e.g., 34, 36 and 38 in FIG. 6, are positioned such that no three individual ticks are closer to each other than 0.016 inch, and in the preferred embodiment, at least 90%, preferably at least 95% of the ticks should have a maximum width of 0.001 inch to 0.0035 inch. The length of each tick is not relevant to embossing fidelity or stainability and varies, with the tick length being selected to replicate a particular natural wood finish, for optimum aesthetics and natural wood replication.

At least 90%, preferably at least 95% of the bundles of ticks, e.g., 34, 36 and 38 in FIG. 6, should be separated by planar spans that are tick-void or tick-free that span at least 0.050 inch at the widest tick-void span between bundles and up to 0.280 inch, preferably separated by tick-void spans varying from 0.060 inch to about 0.218 inch at the widest tick-void span between bundles. No more than 10% of the tick bundles, preferably no more than 5% of the tick bundles, should be separated by planar, tick-free spans greater, at their widest tick-void span, than 0.280 inch to avoid the appearance of the open grain, lower value wood grains.

To achieve the full advantage of the present invention, particularly for best tick embossing fidelity, the tick groupings or bundles should reflect the following relationship for at least 90%, preferably 95%, of the tick bundles: where six to ten bundled ticks occur adjacent to each other, a span between adjacent ticks should be 0.250 inch±0.031 inch; and where three to five bundled ticks occur, a span between adjacent ticks should be 0.093 inch±0.016 inch.

The above important parameters for ticks, spacing of ticks within tick bundles, and spacing of tick bundles separated by tick-free regions, that enable the reproduction of a tight grained, natural wood appearance with excellent embossing fidelity and stainability, is accomplished, for example, by a modified photographic reproduction technique to form the embossing plate. The natural photographic reproduction technique presently used to make an embossing plate that simulates a natural wood grain appearance in an embossed fiberboard is well known. Generally, natural wood having a desired wood grain pattern is photographed onto a transparent film such that the grain pattern appears in dark indicia on the film. The dark indicia on the film then is reproduced, photographically, onto an embossing plate which then is etched away, at a desired depth, over the transparent areas of the film, leaving higher embossing plate regions, representing the wood grain, corresponding to the dark grain patterns or the dark indicia on the film.

This natural photographic technique for producing an embossing plate is modified in accordance with the present invention by deleting essentially all ticks (e.g., dark indicia) on the film that are too close together or otherwise do not fit the above-identified tick bundle parameters. Deletion of lines on the film can be achieved in any number of ways, such as by physically cutting away undesired dark indicia from the photographic film, or by "whiting out" undesired dark indicia on the film, such as with a white paint. In this manner, undesired dark indicia (tic reproductions that do not fit the above-identified tick and tick bundle parameters) on the photographic film are not reproduced in the form of embossing protuberances or spikes on the resulting embossing plate.

It will be understood that the present invention has been described only by way of preferred embodiments and that numerous changes in details of construction, combination, and arrangement of parts can be resorted to without departing from the spirit and scope of the invention as hereunder claimed.

What is claimed and sought to be secured by Letters Patent of the United States is:

1. An embossed, decorative, man-made embossed article having an embossed surface portion containing at least about 80% by weight cellulosic fibers and sufficient binder to adhere the cellulosic fibers together into a structurally sound article having a specific gravity in the range of 0.96 to 1.08, a surface of said article having a pattern of embossed ticks stained to visually distinguish the embossed ticks from surrounding surface portions of said article, said embossed ticks formed in elongated bundles to replicate a wood grain pattern, said embossed ticks and said bundles of ticks satisfying the following criteria:
  (a) at least 90% of said embossed ticks, in bundles of three or more adjacent ticks, are spaced at least 0.016 inch;
  (b) at least 90% of said embossed ticks are embossed a depth in the range of 0.003 inch to 0.007 inch; and
  (c) at least 90% of the embossed tick bundles are separated by tick-free spans on the surface of the article, at the widest measurement of tick-free area between tick bundles, in the range of 0.050 to 0.280 inch.

2. An embossed article in accordance with claim 1, wherein the article includes a planar panel surrounded by a molded depression including an inclined wall having a contoured upper surface integral with an upper surface of said planar panel, said inclined wall extending downwardly from said planar panel toward a bottom of the depression, said depression being surrounded on all sides by co-planar surfaces.

3. An embossed article in accordance with claim 1, wherein at least 90% of the ticks are embossed into the surface of the article to a maximum depth in the range of 0.003 to 0.007 inch.

4. An embossed article in accordance with claim 1, wherein at least 90% of the embossed tick bundles are separated by tick-free spans on the surface of the article, measuring at the widest measurement of a tick-free span between tick bundles, in the range of 0.060 to 0.218 inch.

5. An embossed article in accordance with claim 1, wherein at least 90% of the embossed ticks have a maximum width in the range of 0.001 to 0.0035 inch.

6. An embossed article in accordance with claim 1, wherein the article is formed from a loose mat of cellulosic fibers that are mechanically refined and felted to produce a mat basis weight in the range of 0.58 to 0.62 pounds per cubic inch.

7. An embossed article in accordance with claim 1, wherein the fibers are mechanically refined in contact with steam at a pressure of 80 to 120 psi.

8. An embossed article in accordance with claim 7, wherein the fibers are mechanically refined in contact with steam at a pressure of 100 to 110 psi.

9. An embossed article in accordance with claim 1 wherein at least 90% of the tick bundles having three to five adjacent ticks have a spacing between adjacent ticks in the range of 0.077 inch to 0.109 inch.

10. An embossed article in accordance with claim 9, wherein at least 90% of the tick bundles having six to ten adjacent ticks have a spacing between adjacent ticks in the range of 0.219 inch to 0.281 inch.

11. A method of manufacturing a consolidated, man-made embossed wood article having an embossed surface portion containing at least about 80% by weight fibrillated cellulosic fibers and sufficient binder for structural integrity comprising: embossing a mat of cellulosic fibers and a binder against an embossing plate having a pattern of protruding embossing ticks separated by planar embossing plate surface portions, said embossing ticks formed in elongated bundles to replicate a wood grain pattern, said embossing ticks and said bundles of ticks satisfying the following criteria:
  (a) at least 90% of said embossed ticks, in bundles of three or more adjacent ticks, are spaced at least 0.016 inch;
  (b) at least 90% of said embossed ticks are embossed a depth in the range of 0.003 inch to 0.007 inch; and
  (c) at least 90% of the embossed tick bundles are separated by tick-free spans on the surface of the article, measuring at the widest measurement of tick-free span between tick bundles, in the range of 0.050 to 0.280 inch.

12. A method in accordance with claim 11, wherein the embossing plate includes a planar panel surrounded by a raised portion for embossing a depression in said mat, said depression including an inclined wall having a contoured upper surface integral with an upper surface of said planar panel, said inclined wall extending downwardly from said planar panel toward a bottom of the depression, said depression being surrounded on all sides by co-planar surfaces.

13. A method in accordance with claim 11, wherein at least 90% of the embossed ticks are embossed into the surface of the article to a maximum depth in the range of 0.003 to 0.007 inch.

14. A method in accordance with claim 11, wherein at least 90% of the tick bundles are separated by tick-free spans on the surface of the article, measuring at the widest measurement of a tick-free span between tick bundles, in the range of 0.060 to 0.218 inch.

15. A method in accordance with claim 11, wherein at least 90% of the embossed ticks have a maximum width in the range of 0.001 to 0.0035 inch.

16. A method in accordance with claim 11, wherein the article is formed from a loose mat of cellulosic fibers that are mechanically refined and felted to produce a mat basis weight in the range of 0.58 to 0.62 pounds per cubic inch.

17. A method in accordance with claim 11, wherein the fibers are mechanically refined in contact with steam at a pressure of 80 to 120 psi.

18. A method in article in accordance with claim 17, wherein the fibers are mechanically refined in contact with steam at a pressure of 100 to 110 psi.

19. A method in accordance with claim 11 wherein at least 90% of the tick bundles having three to five adjacent ticks have a spacing between adjacent ticks in the range of 0.077 inch to 0.109 inch.

20. A method in accordance with claim 19, wherein at least 90% of the tick bundles having six to ten adjacent ticks have a spacing between adjacent ticks in the range of 0.219 inch to 0.281 inch.

21. A method in accordance with claim 11, further including forming the wood grain tick pattern on the embossing plate by a modified photographic process comprising removing a portion of the ticks representing a wood grain pattern from a photographic reproduction of said wood grain pattern to produce an altered photographic reproduction of said wood grain pattern; and then forming the embossing plate to include embossing protrusions corresponding to the ticks in the altered reproduction of the wood grain pattern.

22. A method in accordance with claim 21, wherein the protrusions corresponding to wood grain ticks in said embossing plate satisfy the following criteria:
   (a) at least 90% of said embossing ticks, in bundles of three or more adjacent ticks, are spaced at least 0.016 inch;
   (b) at least 90% of said embossing ticks have a height extending upwardly from surrounding planar regions in the range of 0.003 inch to 0.007 inch; and
   (c) at least 90% of the embossing tick bundles are separated by protrusion-free spans on the surface of the article, at the widest measurement of protrusion-free span between tick bundles, in the range of 0.050 to 0.280 inch.

23. A method in accordance with claim 21, wherein the embossing plate includes a planar panel surrounded by a protrusion capable of embossing a depression in said mat, said depression including an inclined wall having a contoured upper surface integral with an upper surface of said planar panel, said inclined wall extending downwardly from said planar panel toward a bottom of the depression, said depression being surrounded on all sides by co-planar surfaces.

* * * * *